United States Patent [19]
Johnson

[11] Patent Number: 5,157,082
[45] Date of Patent: Oct. 20, 1992

[54] THERMOPLASTIC COMPOSITIONS CONTAINING GROUND VULCANIZED RUBBER AND POLYOLEFIN RESIN

[75] Inventor: Lane D. Johnson, Duluth, Minn.

[73] Assignee: Synesis Corporation, Akron, Ohio

[21] Appl. No.: 611,845

[22] Filed: Nov. 13, 1990

[51] Int. Cl.$^5$ ................................................ C08L 9/06
[52] U.S. Cl. .................................... 525/237; 525/221; 525/227; 525/232; 525/233
[58] Field of Search ............... 525/237, 221, 232, 233, 525/227

[56] References Cited

U.S. PATENT DOCUMENTS

| | | | |
|---|---|---|---|
| 4,042,648 | 8/1977 | Kitamura et al. | 525/211 |
| 4,116,914 | 9/1978 | Coran et al. | 525/232 |
| 4,131,654 | 12/1978 | Herman et al. | 525/232 |
| 4,141,878 | 2/1979 | Coran et al. | 525/240 |
| 4,206,096 | 6/1980 | Takagi | 525/221 |
| 4,350,795 | 9/1982 | Bohm et al. | 525/232 |
| 4,355,139 | 10/1982 | Coran et al. | 525/221 |
| 4,386,182 | 5/1983 | Zijp | 524/375 |
| 4,409,365 | 10/1983 | Coran et al. | 525/78 |
| 4,555,546 | 11/1985 | Patel | 525/221 |
| 4,584,348 | 4/1986 | Nagano | 525/211 |
| 4,654,402 | 3/1987 | patel | 525/221 |
| 4,808,665 | 2/1989 | Patel et al. | 525/232 |
| 4,833,189 | 5/1989 | Miyazono et al. | 525/232 |
| 4,845,145 | 7/1989 | Hazelton et al. | 525/232 |
| 4,978,717 | 12/1990 | Hazelton et al. | 524/525 |

Primary Examiner—Paul R. Michl
Assistant Examiner—Edward J. Cain
Attorney, Agent, or Firm—Reese Taylor

[57] ABSTRACT

Thermoplastic compositions comprising mixtures of ground vulcanized rubber and polyolefin resin are described; they are improved by incorporation of functionalized olefin polymer.

16 Claims, No Drawings

THERMOPLASTIC COMPOSITIONS CONTAINING GROUND VULCANIZED RUBBER AND POLYOLEFIN RESIN

BACKGROUND OF THE INVENTION

1. Field of the Invention

This invention relates to improved polymer blends of ground vulcanized rubber and polyolefin resin, and in particular, blends of enhanced compatibility due to the presence of a functionalized olefin polymer.

2. Description of the Prior Art

Blends of ground vulcanized rubber and thermoplastic polymer are known. For example, in U.S. Pat. No. 4,028,288, a method is described for preparing mixtures of vulcanized rubber particles and a thermoplastic polymer. However, because of insufficient bonding between the rubber particles and the polymer phase, the resulting compositions exhibited poor mechanical properties, especially low elongation. Therefore, if the compatibility of the blend components can be increased, improved compositions would be obtained.

In U.S. Pat. No. 4,386,182 a thermoplastic elastomeric composition is described, consisting of comminuted vulcanized rubber, a thermoplastic olefin or di-olefin polymer, and a compatibilizer additive. This patent, however, is not pertinent to the present invention in that the compatibilizer additive is the reaction product of a hydroxyl compound with an alkene oxide. As will be shown in a comparative example below, the mechanical properties of such composition (e.g. % elongation at break) are inferior relative to the mechanical properties of the compositions of the subject invention.

Each year, in the U.S., more than 240 million used tires are discarded. This, in addition to an estimated 2 billion tires which already exist. Above ground storage of tires presents a fire and health hazard. Once ignited, a pile of tires can burn for months, polluting the air with black smoke and strong odor. Tires constitute an ideal breeding ground for disease carrying mosquitos and rodents. Buried, whole tires settle unevenly and rise to the surface creating landfill management problems. These hazards are well documented in the various tire studies sponsored by the EPA, other federal agencies and state agencies. Both the U.S. Congress and the EPA have previously determined that scrap tires constitute a significant waste management problem. For example, in the 1984 amendment to the Resource Conservation and Recovery Act of 1976, Congress directed EPA to issue procurement guidelines for tires. Many state legislations have enacted or are considering legislation to regulate scrap tire storage and/or disposal. Because of economic and environmental reasons, reclaiming of scrap tires by thermal and/or chemical "devulcanization" has dramatically decreased in recent years. Over the period between 1941 and 1985 consumption of reclaimed rubber has decreased from 32% of new rubber to less than 5%. Burning of tires as fuel has raised concerns about air pollution.

SUMMARY OF THE INVENTION

It has now been discovered that an improved composition comprising a blend of ground vulcanized rubber and a polyolefin resin is obtained by the incorporation therein, of a functionalized olefin polymer. Blends containing high proportions of ground vulcanized rubber are elastoplastic, which means they are elastomeric, but can be processed as a thermoplastic. The melt processability of these compositions allows shaped articles of these compositions to be molded therefrom without the time consuming cure step required with conventional rubbers, thereby reducing finished part cost.

More specifically, improved compatibilized polymer blends comprise (a) ground vulcanized rubber in the form of small dispensed particles specifically of 1.5 mm number average or below, (b) polyolefin resin, (c) functionalized olefin polymer, and if desired, additives such as fillers, pigments, reinforcements, stabilizers, processing aids, colorants, plasticizers and other compounding or modifying ingredients may be included in order to meet specific performance needs of each customer.

DESCRIPTION OF THE PREFERRED EMBODIMENTS

Component (a) is mechanically or cryogenically ground vulcanized rubber in the form of small particles essentially of 1.5 mm number average or below and more preferably a particle size between 0.1 mm and 1.0 mm number average. Exemplary of the vulcanized rubber include natural rubber, synthetic polymer or copolymer rubber derived from alkadienes, or mixtures thereof. For economic reasons, vulcanized rubber from scrap tires, retreaded tire buffings, tire tubes, and miscellaneous waste thermoset rubber articles is especially preferred for purposes of the subject invention.

The polyolefin resin listed as component (b) is a solid, high molecular weight polymeric material made by polymerizing one or more olefinic monomers in a conventional manner. Examples of such olefins are ethylene, propylene, 1-butene, 1-pentene, 2methyl-1 propene, or mixtures thereof. Preferred polyolefin resins are polyethylene or polypropylene. Also suitable for the practice of the invention are copolymers of two or more olefins with copolymers of ethylene and propylene being preferred.

The functionalized olefin polymer listed as component (c) is a copolymer of at least one olefin and one or more ethylenically unsaturated organic monomers. Preferred olefins include ethylene, propylene, butylene, butadiene, isoprene, including hydrogenated butadiene or isoprene. Examples of the organic monomers are those selected from the group consisting of unsaturated mono or dicarboxylic acids of 3-20 carbon atoms and their derivatives such as acid anhydrides, maleamic acids, acid halides, esters, metal salts and the like; vinyl esters of saturated carboxylic acids where the acid group has 2-18 carbon atoms, vinyl alkyl ethers wherein the alkyl group has 1-18 carbon atoms, vinyl or vinylidene halides, acrylonitrile, methacrylonitrile, and vinyl aromatic compounds. Of course, more than one of these organic monomers may be copolymerized with an olefin to form the functionalized olefin polymer useful in the practice of the subject invention. Preferred functionalized olefin polymers contain at least one olefin, including hydrogenated butadiene or isoprene, modified by a reactive functional group such as carboxylic acid or its derivatives. The functional groups may be either (i) on the polymer backbone such as in copolymers of ethylene and acrylic acid available from Dow Chemical Company under the trade name Primacor or (ii) grafted onto the main polymer backbone, examples of which are polypropylene grafted with maleic acid anhydride available from Hercules-Himont as Hercoprime and polypropylene grafted with acrylic acid available from BP Performance Polymers, Inc. under the trade name Polybond. The industrial technology that is used for making such functionalized olefin polymers is known and is covered in several U.S. Patents. Examples of such technology include U.S. Pat. No. 3,862,265 (to Steinkamp et al), U.S. Pat. No. 4,001,172 (to Steinkamp et al), U.S. Pat. No. 3,658,948 (to McConnel), U.S. Pat. No. 3,746,676 (to Joymer et al), U.S. Pat. No. 3,882,194 (to Krebaum et al), Japanese Kokai 58/11508 (1983) (to Okono et al), U.S. Pat. No. 4,146,590 (to Yamamoto et al), U.S. Pat. No. 3,177,269 (to Nowak et al), U.S. Pat. No. 3,131,990 (to Alberto et al), and the like. Generally, the amount of organic monomer is used at a rate of about 0.5 to 30 parts by weight per 100 parts by weight of functionalized olefin polymer. It can, however, be considerably lower with amounts in the vicinity of 0.1 percent being enough to enhance the compatibility of the ground vulcanized rubber particles and the polyolefin resin.

Although not essential components of the compositions of this invention, various amounts of any number of conventional fillers or compounding ingredients may be admixed. Examples of such ingredients include various carbon blacks, clay, silica, alumina, calcium, carbonate, titanium dioxide, pigments, flame retardants, reinforcements, stabilizers, curing agents, anti-oxidants, anti-degradants, tackifiers, processing aids such as lubricants and waxes, plasticizers, etc. The amount used depends, at least in part, upon the quantities of the ingredients in the composition.

A blend composition of the present invention may be manufactured in a single operation or in a number of operational steps. In the single step operation the vulcanized rubber particles, the functionalized olefin polymer and the polyolefin resin, with the necessary fillers and additives are charged at the desired rates to a suitable mixer, for example, a Banbury internal mixer, two roll mill or extruder, or any device that will allow efficient mixing of the blend at the desired temperature to obtain a composition of the invention. Alternatively, as an example of a multistep operation, a composition of the invention may be prepared by first separately mixing a blend of ground vulcanized rubber and polyolefin resin. The independently prepared blend is then melt mixed together with the functionalized olefin polymer in a suitable mixer to obtain a composition of the invention. The blending is done at a temperature high enough to soften the polymers for adequate blending, but not so high as to degrade the polymers. Generally speaking, this blending temperature ranges from 140° to 200° C., and blending is carried out for a time sufficient to homogeneously blend the components.

In accordance to this invention, the relative proportions of the vulcanized rubber particles, polyolefin resin and the functionalized olefin polymer depend, at least in part, upon the type and molecular weight of the rubber, polyolefin resin and functionalized olefin polymer, and the presence of other ingredients in the composition such as fillers, reinforcements, plasticizers, etc. In general, the compositions of the invention comprise about 10–90 parts by weight of ground vulcanized rubber, and correspondingly, about 90–10 parts by weight of polyolefin resin. Compositions comprising about 20 to about 80 parts by weight of ground vulcanized rubber, and correspondingly, about 80 to about 20 parts by weight of polyolefin resin are preferred. An amount of functionalized olefin polymer which is sufficient to improve the compatibility between the ground vulcanized rubber and the polyolefin resin is satisfactory for the compositions of the invention. Improved compatibility is generally indicated by an increase in elongation or tensile strength or both. An increase in elongation of 25%, preferably 50% or more, indicates improved compatibility. The amount of functionalized olefin polymer required is readily determined by incrementally increasing the amount of functionalized olefin polymer in the blend until the improved properties are observed. Generally, at least 0.5 part by weight of functionalized olefin polymer per 100 parts by weight of polyolefin resin is enough to observe an improvement in compatibility. Typically, the amount of functionalized olefin polymer is about 0.5 to 50 pars by weight per 100 parts by weight of polyolefin resin. Increasing the amount of functionalized olefin polymer within this range usually increases compatibility. Of course, it is understood that the functionalized olefin polymer may replace all of the polyolefin resin, if desired, but the improvement in properties may not be substantially greater than what is obtained by the use of lesser quantities of functionalized olefin polymer.

The blend compositions of the subject invention are melt processible using conventional plastic processing equipment. The properties of the blend depend upon the properties of the components with a wide range of properties being available simply by varying the proportions of the blend components. Blends containing high proportions of ground vulcanized rubber are elastoplastic, which means they are elastomeric, but can be processed using conventional plastic processing equipment. For example, these compositions have elongation at break values of 100 to 300 percent without substantial permanent tension set (i.e. less than 50 percent). In addition, the melt processability of these compositions allows shaped articles of these compositions to be molded therefrom without the time consuming cure step required with conventional rubbers, thereby reducing finished part cost significantly. Blends containing high proportions of polyolefin resin are moldable, rigid thermoplastic compositions exhibiting improved impact resistance. Since in process scrap can be remelted and recycled there is no waste, resulting in additional cost savings. The thermoplastic nature of the compositions of the subject invention enables shaped articles made from these compositions to be recycled in the same manner as conventional thermoplastics, thus helping to alleviate the growing environmental problem of solid waste disposal. In addition, the composition of the subject invention is adaptable to reprocessing of vulcanized rubber from scrap tires and, therefore, it can serve environmental protection by reducing solid waste and the fire/health hazards associated with above ground storage of tires. Improved compositions of the invention can be used to form a variety of molded, extruded, or calendered articles. Various uses for the compositions of the invention include seals and gaskets, automotive parts, anti-skid surfaces, and reinforced hoses. They can be used to coat fabric, industrial belts and various hard surfaces by extrusion coating. They also find utility as impact modifiers for other polymer systems. Compositions within the scope of this invention can be used as the protective covering of reinforced or unreinforced tubes of similar or different compositions.

The subject invention will be more fully appreciated with reference to the examples that follow. In the stated nonrestrictive examples all percentages are by weight of total composition unless otherwise indicated.

EXAMPLE 1

The vulcanized rubber particles were obtained by grinding passenger car tires, consisting mainly of SBR rubber. The average particle size was 0.5 mm. The rubber particles, functionalized olefin polymer and polyolefin resin were mixed in a Brabender mixer at 100 RPM with the oil bath controlled at 180-190 C. for five minutes. After blending, to demonstrate that the compositions were melt processible, each batch was placed in a picture frame mold at ambient temperature and compression molded into sheet 2.0 mm thick in a hydraulic press, both platens of which had been preheated to 200 C. The press was heated for an additional 5 minutes. The molded sheet was then rapidly cooled under pressure to ambient temperature and removed from the press. Test specimens were die cut from the molded sheet and used after 24 hours storage at room temperature. The molded sheet samples were re-melt processible.

The stress-strain properties of the compositions are determined in accordance with the procedures set forth in ASTM D-412. Test specimens are pulled with an Instron Tester at 20.0 inches per minute to failure. The properties are shown in Table 1. True stress at break (TSB) is the tensile strength at break multiplied by the extension ratio also at break. Extension ratio is the length of a tensile test speciment at break divided by the original, unstressed length of the test specimen. Alternately, extension ratio is 1.00 plus 1/100 of the percent ultimate elongation.

Blend compositions are prepared which contain the ingredients in Table 1. Batch A is a control containing unmodified polypropylene. Batch B is a control containing unmodified polyethylene. Batches C and D illustrate improved compositions of the invention. The data show that the incorporation of a functionalized olefin polymer results in substantial improvement in elongation. True stress at break, TSB, shows a 2 to 3 fold increase over the controls.

TABLE 1

|  | A | B | C | D |
|---|---|---|---|---|
| Rubber (1) | 60 | 60 | 60 | 60 |
| PP (2) | 40 | — | 15 | 15 |
| PE (3) | — | 40 | — | — |
| S(EB)S (4) | — | — | 25 | — |
| EVA (5) | — | — | — | 25 |
| Shore Hardness (6) | 46D | 42D | 23D | 26D |
| Tensile at Break, psi (7) | 1249 | 1177 | 760 | 825 |
| Elongation at break, % (7) | 25 | 35 | 241 | 221 |
| M100, psi (7) | — | — | 550 | 610 |
| TSB (8) | 1561 | 1589 | 2589 | 2648 |

(1) Rubber = Ground passenger car tires, 0.5 mm average particle size
(2) PP = Polypropylene
(3) PE = Polyethylene
(4) S(EB)S = Triblock copolymer consisting of styrene end blocks and poly-(ethylene/butylene) midblocks, (29% styrene)
(5) EVA = Ethylene vinyl acetate copolymer (25% VA)
(6) ASTM D-2240
(7) ASTM D-412
(8) TSB = True stress at break

EXAMPLE 2

By the same procedure as Example 1, the following compositions were blended (values are in weight percent). This sample serves to illustrate the effect of adding a functionalized olefin polymer containing reactive functional groups such as carboxylic acids. Batch A is a control containing unmodified polyethylene. Batch C contains an unmodified triblock copolymer consisting of styrene end blocks and poly-(ethylene/butylene) midblocks. Batch B contains a copolymer ethylene an methacrylic acid. Batch D contains a maleic anhydride functionalized triblock copolymer consisting of styrene end blocks and poly-(ethylene/butylene) midblocks. The data (Table 2) show a substantial improvement in mechanical properties by the incorporation therein of a carboxylic acid functionalized olefin polymer. In addition, it was also noted during the Instron tensile test that the specimens containing unmodified copolymer began to tear in several places well before breaking while the specimens containing carboxylic acid functionalized olefin polymer maintained their integrity far better, which also indicates a higher degree of compatibility.

TABLE 2

|  | A | B | C | D |
|---|---|---|---|---|
| Rubber (1) | 60 | 60 | 80 | 80 |
| PP (2) | — | — | 10 | 10 |
| PE (3) | 40 | 15 | — | — |
| EMAA (4) | — | 25 | — | — |
| S(EB)S (5) | — | — | 10 | — |
| S(EB)S/2% MA (6) | — | — | — | 10 |
| Shore Hardness | 42D | 26D | 64A | 64A |
| Tensile at break, psi | 1177 | 1263 | 491 | 719 |
| Elongation at break, % | 35 | 227 | 142 | 173 |
| M100, psi | — | 899 | 458 | 614 |
| Tension set, % (7) | — | 35 | — | — |
| TSB | 1589 | 4130 | 1188 | 1963 |

(1) Rubber = Ground passenger car tires, 0.5 mm average particle size
(2) PP = Polypropylene
(3) PE = Polyethylene
(4) EMAA = Ethylene/Methacrylic acid copolymer (20% MAA)
(5) S(EB)S = Triblock copolymer consisting of styrene end blocks and poly-(ethylene/butylene) midblocks. (29% styrene)
(6) S(EB)S/2% MA = Maleic acid anhydride functionalized triblock copolymer consisting of styrene end blocks and poly-(ethylene/butylene) midblocks, (2% MA, 28% styrene)
(7) ASTM D-412

EXAMPLE 3

By the same procedure as Example 1, the following compositions were blended (values are in weight percent). This example serves to illustrate the effect in changing the relative proportion of the rubber, functionalized olefin polymer and polyolefin resin (Table 3).

TABLE 3

|  | A | B | C | D | E | F |
|---|---|---|---|---|---|---|
| Rubber (1) | 50 | 50 | 60 | 60 | 80 | 80 |
| PP (2) | 50 | 25 | 40 | 15 | 20 | 10 |
| S(EB)S/ 2% MA (3) | — | 25 | — | 25 | — | 10 |
| Shore Hardness | 50D | 32D | 46D | 23D | 75A | 64A |
| Tensile at break, psi | 1359 | 1332 | 1249 | 951 | 538 | 719 |
| Elongation at break, % | 25 | 185 | 25 | 245 | 82 | 173 |
| M100, psi | — | 1208 | — | 681 | — | 614 |
| TSB | 1744 | 3796 | 1561 | 3281 | 939 | 1963 |

(1) Rubber = Ground passenger car tires, 0.5 mm average particle size
(2) PP = Polypropylene
(3) S(EB)S/2% MA = Maleic acid anhydride functionalized triblock copolymer consisting of styrene end blocks and poly-(ethylene/butylene) midblocks, (2% MA, 28% styrene)

COMPARATIVE EXAMPLE 4

By the same procedure as Example 1, the following compositions were blended (values are in weight percent). Batches B, D and F were prepared using 1.0% CARBOWAX 4000 in accordance with Example 1 of U.S. Pat. No. 4,386,182. The results show that blends produced with CARBOWAX 4000 have inferior mechanical properties (Table 4).

TABLE 4

|  | A | B | C | D | E | F |
|---|---|---|---|---|---|---|
| Rubber (1) | 60 | 60 | 60 | 60 | 60 | 60 |
| PP (2) | 40 | 39 | 30 | 30 | 15 | 15 |
| CARBO-WAX 4000 (3) | — | 1.0 | — | 1.0 | — | 1.0 |
| S(EB)S (4) | — | — | 10 | 9 | 25 | 24 |
| Shore Hardness | 46D | 46D | 39D | 40D | 23D | 23D |
| Tensile at break, psi | 1249 | 1141 | 985 | 871 | 760 | 706 |
| Elongation at break, % | 25 | 29 | 81 | 79 | 241 | 213 |
| M100, psi | — | — | — | — | 550 | 524 |
| TSB | 1561 | 1472 | 1783 | 1559 | 2592 | 2209 |

(1) Rubber = Ground passenger car tires. 0.5 mm average particle size
(2) PP = Polypropylene
(3) CARBOWAX 4000 = Non-ionic surfactant of the polyethyleneoxide type of Union Carbide
(4) S(EB)S = Triblock copolymer consisting of styrene end blocks and poly-(ethylene/butylene) midblocks. (29% styrene)

Although the invention has been illustrated by typical examples, it is not limited thereto. For example, it is envisioned that the use of functionalized olefins containing functional groups which are derivatives of carboxylic acids such as acid anhydrides, maleamic acids, acid halides, esters, metal salts and the like will improve the compatibility between the ground vulcanized rubber particles and the polyolefin resin. Changes and modifications of the examples of the invention herein chosen for the purpose of disclosure can be made which do not constitute departure from the spirit and scope of the invention.

The following illustrates the versatility of the composition of the subject invention:

Batch D of Example 3 was prepared in a 9D Banbury internal mixer at 180-190 C. for five minutes. The blended composition was pelletized and then fed to a Davis Standard 1½ inch (4.8 cm) diameter extruder with a single stage screw and a length to diameter ratio of 24:1. The barrel temperatures were controlled to obtain a 180 C. melt temperature. The material was extruded through a sheet die. This composition is pellet from was also injection molded in a reciprocating type injection molding machine, with all zones of the barrel heated to 170 C. and the mold at 25 C. Using an injection pressure of 1000 psi, the molten material filled out the cavity of the plaque mold in 1.5 seconds and was allowed to cool an additional 20 seconds before the mold was opened and the finished part ejected.

The extrusion and injection molding demonstrations described above show that compositions within the scope of this invention can be processed in standard thermoplastics processing equipment and used to fabricate such articles as extruded profiles, tubing, hoses, sheet, etc. or miscellaneous injection molded seal, gaskets, automotive parts or mechanical rubber goods.

What is claimed is:

1. A thermoplastic composition comprising a blend of about 10-90 parts by weight of ground vulcanized rubber in the form of small dispersed particles essentially of 1.5 mm number average or below, wherein said rubber is selected from the group consisting of natural rubber, synthetic polymer or copolymer rubber derived from alkadienes, or mixtures thereof, and correspondingly, about 90 to 10 parts by weight of polyolefin resin and at least 0.5 parts by weight of one or more functionalized olefin polymers per 100 parts by weight of polyolefin resin wherein said functionalized olefin polymer is a copolymer of at least one olefin and at least one ethylenically unsaturated organic monomer; wherein said organic monomer is selected from the group consisting of unsaturated mono or dicarboxylic acids having from 3 to 20 carbon atoms; acid anhydride, maleamic acid, acid halide, ester and metal salt derivatives of said unsaturated mono or discarboxylic acids; vinyl esters of saturated carboxylic acids wherein the acid constituent of said saturated carboxylic acid has from 2 to 18 carbon atoms; vinyl alkyl ethers wherein said alkyl constituent has from 1 to 18 carbon atoms; vinyl halides; vinylidene halides; acrylonitrile; methacrylonitrile; and styrene.

2. The composition of claim 1 wherein the ground vulcanized rubber is obtained by grinding scrap tires, retreaded tire buffings, tire tubes and miscellaneous waste thermoset rubber articles with subsequent removal of ferrous constituents or any other contaminants.

3. The composition of claim 1, wherein is incorporated 0-300 parts by weight percent based on the composition of one or more additives, selected from the group consisting of carbon black, clay, silica, alumina, calcium carbonate, titanium dioxide, pigments, flame retardants, antioxidants, antidegredents, tackifiers, reinforcing materials, processing aids, and plasticizers.

4. The composition of claim 1 wherein the polyolefin resin is selected from the group consisting of polyethylene, polypropylene, polybutadiene, polybutylene, polyisoprene, or mixtures thereof.

5. The composition of claim 4 wherein the polyolefin resin is polyethylene.

6. The composition of claim 1 wherein the functionalized olefin polymer is a copolymer of at least one olefin, including hydrogenated butadiene or isoprene, and one or more ethylenically unsaturated organic monomers selected from the group consisting of unsaturated mono or dicarboxylic acids of 3-20 carbon items, acid anhydrides of said unsaturated mono or dicarboxylic acids, acid halides of said unsaturated mono or dicarboxylic acids, esters of said unsaturated mono or dicarboxylic acids, maleamic acid derivatives of said unsaturated mono or dicarboxylic acids, metal salts of said unsaturated mono or dicarboxylic acids, vinyl esters of saturated carboxylic acids where said acid group has 2-18 carbon atoms, vinyl alkyl ethers wherein the alkyl group has 1-18 carbon atoms, vinyl or vinylidene halides, acrylonitrile, methacrylonitrile, and styrene.

7. The composition of claim 6 wherein the functionalized olefin polymer contains at least one functional group selected from the group consisting of mono or dicarboxylic acids and their derivatives selected from the group consisting of acid anhydrides, maleamic acids, acid halides, esters, and metal salts, in an amount of about 0.5 to 30 parts by weight per 100 parts by weight of functionalized olefin polymer.

8. A process for manufacturing thermoplastic compositions which comprises mixing a blend of about 10-90 parts by weight of ground vulcanized rubber in the form of small dispersed particles essentially of 1.5 mm number average or below, wherein said rubber is selected from the group consisting of natural rubber, synthetic polymer or copolymer rubber derived from alkadienes, or mixtures thereof, and correspondingly, about 90 to 10 parts by weight of polyolefin resin and at least 0.5 parts by weight of one or more functionalized olefin polymers per 100 parts by weight of polyolefin resin at a temperature high enough to soften or melt the polymers, and for sufficient time to obtain a homogeneous mixture wherein said functionalized olefin polymer is a copolymer of at least one olefin and at least one ethylenically unsaturated organic monomer; wherein said organic monomer is selected from the group consisting of unsaturated mono or dicarboxylic acids having from 3 to 20 carbon atoms; acid anhydride, maleamic acid, acid halide, ester and metal salt derivatives of said unsaturated mono or dicarboxylic acids; vinyl esters of saturated carboxylic acids wherein the acid constituent of said saturated carboxylic acid has from 2 to 18 carbon atoms; vinyl alkyl ethers wherein said alkyl constituent has from 1 to 18 carbon atoms; vinyl halides; vinylidene halides; acrylonitrile; methacrylonitrile; and styrene.

9. The process of claim 8 wherein the ground vulcanized rubber is obtained by grinding scrap tires, retreaded tire buffings, tire tubes and miscellaneous waste thermoset rubber articles with subsequent removal of ferrous constituents or any other contaminants.

10. The process of claim 8, wherein is incorporated 0–300 parts by weight percent based on the composition of one or more additives, selected from the group consisting of carbon black, clay, silica, alumina, calcium carbonate, titanium dioxide, pigments, flame retardants, antioxidants, antidegredents, tackifiers, reinforcing materials, processing aids, and plasticizers.

11. The process of claim 8 wherein the polyolefin resin is selected from the group consisting of polyethylene, polypropylene, polybutadiene, polybutylene, polyisoprene or mixtures thereof.

12. The process of claim 11 wherein the polyolefin resin is polyethylene.

13. The process of claim 8 wherein the functionalized olefin polymer is a copolymer of at least one olefin, including hydrogenated butadiene or isoprene, and one or more ethylenically unsaturated organic monomers selected from the group consisting of unsaturated mono or dicarboxylic acids of 3-20 carbon items, acid anhydrides of said unsaturated mono or dicarboxylic acids, acid halides of said unsaturated mono or dicarboxylic acids, esters of said unsaturated mono or dicarboxylic acids, maleamic acid derivatives of said unsaturated mono or dicarboxylic acids, metal salts of said unsaturated mono or dicarboxylic acids, vinyl esters of saturated carboxylic acids where said acid group has 2–18 carbon atoms, vinyl alkyl ethers wherein the alkyl group has 1–18 carbon atoms, vinyl or vinylidene halides, acrylonitrile, methacrylonitrile, and styrene.

14. The process of claim 13 wherein the functionalized olefin polymer contains at least one functional group selected from the group consisting of mono or dicarboxylic acids and their derivatives selected from the group consisting of acid anhydrides, maleamic acids, acid halides, esters, and metal salts, in an amount of about 0.5 to 30 parts by weight per 100 parts by weight of functionalized olefin polymer.

15. A thermoplastic composition comprising a blend of about 10–90 parts by weight of ground vulcanized rubber in the form of small dispersed particles essentially of 1.5 mm number average or below, wherein said rubber is selected from the group consisting of natural rubber, synthetic polymer or copolymer rubber derived from alkadienes, or mixtures thereof, and correspondingly, about 90 to 10 parts by weight of a functionalized olefin wherein said functionalized olefin polymer is a copolymer of at least one olefin and at least one ethylenically unsaturated organic monomer; wherein said organic monomer is selected from the group consisting of unsaturated mono or dicarboxylic acids having from 3 to 20 carbon atoms; acid anhydrides, maleamic acid, acid halide, ester and metal salt derivatives of said unsaturated mono dicarboxylic acids; vinyl esters of saturated carboxylic acids wherein the acid constituent of said saturated carboxylic acids wherein the acid constituent of said saturated carboxylic acid has from 2 to 19 carbon atoms; vinyl alkyl esters wherein said alkyl constituent has from 1 to 18 carbon atoms; vinyl halides; vinylidene halides; acrylonitrile; methacrylonitrile; and styrene.

16. A process for manufacturing thermoplastic compositions which comprises mixing a blend of about 10–90 parts by weight of ground vulcanized rubber in the form of small dispersed particles essentially of 1.5 mm number average or below, wherein said rubber is selected from the group consisting of natural rubber, synthetic polymer or copolymer rubber derived from alkadienes, or mixtures thereof, and correspondingly, about 90 to 10 parts by weight of one or more functionalized olefin polymers at a temperature high enough to soften or melt the polymers, and for sufficient time to obtain a homogenous mixture wherein said functionalized olefin polymer is a copolymer of at least one olefin and at least one ethylenically unsaturated organic monomer; wherein said organic monomer is selected from the group consisting of unsaturated mono or dicarboxylic acids having from 3 to 20 carbon atoms; acid anhydride, maleamic acid, acid halide, ester and metal salt derivatives of said unsaturated mono or dicarboxylic acids; vinyl esters of unsaturated carboxylic acids wherein the acid constituent of said saturated carboxylic acids has from 2 to 18 carbon atoms; vinyl alkyl ethers wherein said alkyl constituent has from 1 to 18 carbon atoms; vinyl halides; vinylidene halides; acrylonitrile; methacrylonitrile and styrene.

* * * * *

UNITED STATES PATENT AND TRADEMARK OFFICE
CERTIFICATE OF CORRECTION

PATENT NO. : 5,157,082
DATED : October 20, 1992
INVENTOR(S) : Lane D. Johnson It is certified that error appears in the above-identified patent and that said Letters Patent is hereby corrected as shown below:

In Column 2, line 34, delete "2methyl-1" and substitute therefor ---2-methyl-1---.

In Column 5, line 28, delete "speciment" and substitute therefor ---specimen---.

In Column 5, in Table 1, in the line entitled "TSB (8)," Column C, delete "2589" and substitute therefor ---2592---.

In Column 6, in Table 3, in the line entitled "Tensile at break, psi," Column A, delete "1359" and substitute therefor ---1395---.

In Column 7, line 43, delete "is" and substitute therefor ---in---; delete "from" and substitute therefor ---form---.

In Column 8, line 8, delete "discarboxylic" and substitute therefor ---dicarboxylic---.

Signed and Sealed this

Twelfth Day of October, 1993

*Attest:*

BRUCE LEHMAN

*Attesting Officer*    *Commissioner of Patents and Trademarks*